Patented Apr. 10, 1934

1,954,743

UNITED STATES PATENT OFFICE 1,954,743

COMPOSITION FOR TREATING METAL

Oscar L. Peterson and Harry L. Peterson, Glen Rock, and Clarence E. Peterson, Ridgewood, N. J., assignors to Delaney Chemical Company, a corporation of Pennsylvania No Drawing. Application February 3, 1932, Serial No. 590,780

9 Claims. (Cl. 148—8)

This invention is a composition for and a method of treating metals so as to cleanse their exposed areas of scale and other forms of surface corrosion.

In the treatment of metals for removal of scale as now commercially practiced, the metal is usually subjected to the action of a pickling bath which has the characteristic of attacking the metal and by chemically combining therewith, softens the scale to such an extent that it will sluff off. This method is open to many objections among which are the following:—First, due to the attack upon it, the metal is dissipated throughout the bath and the scale accumulates in the form of a sludge. Second, the solution continues to act upon the metal surface after the scale is removed, necessitating the use of a neutralizing agent after treatment. Third, in the methods as commonly practiced, there is a very substantial generation of dangerous fumes in the vicinity of the tank in which the metal is treated. Fourth, inhibitors are commonly employed to cut down the generation of fumes and to retard action on the metal which is particularly objectionable in that it also retards the action upon the scale. Fifth, the tanks must be periodically cleaned out to remove sludge, and the life of the tank itself is of comparatively short duration. Sixth, in addition to the above, the time element is a very important factor in that it rarely requires less than approximately one hour and a half in order to secure complete removal of scale, the time required of course being somewhat dependent upon the particular scale formation. Seventh, the present time pickling baths require such a high concentration of acid that it is a serious menace to the workmen who must handle the materials, and is also highly expensive because of the destructive effect upon the vessels and apparatus required to handle it. Eighth, even alloy steels of the type which most readily respond to the present time pickling process to remove scale must be scrubbed by hand or by scrubbing machines, in fully concentrated hydrochloric acid or nitric acid, which is obviously a serious menace to the workmen who must perform the scrubbing functions.

The main object of the present invention is to overcome the foregoing objections by providing a composition which instead of attacking the metal and physically removing the scale by an indirect attack thereon, will directly attack and dissolve the scale and remove it without apparent effect upon the metal, other than the production of a thoroughly cleansed surface. A further object is to provide a composition of the character mentioned, and a method of using the same by which there is no dissipation of metal in the pickling bath and there are practically no fumes produced by said bath. A further object is to provide a composition which in use eliminates the necessity of employing so-called inhibitors, thereby avoiding retardation of the action on the scale, and which also possesses the characteristic of very materially reducing the time element in the operation. A further object is to provide a composition capable of removing scale of the character which heretofore has been considered impossible to remove except by use of a sand blast. A further object is to provide a composition which ceases to function upon the bare metal after removing the scale so that no neutralizing agent of any description is required, all that is necessary being to rinse the treated metal with clear water. A further object is to provide a scale removing treatment for metal surfaces, capable of producing a thoroughly cleansed surface capable of receiving a high polish by means of standard buffing methods.

The invention will be hereinafter fully set forth and particularly pointed out in the claims:—

The composition primarily consists of a mixture of a metal sulphate such as copper sulphate, aluminum sulphate or the like, a metal acetate such as aluminum acetate, iron acetate or the like and a sodium salt such as sodium chloride, sodium carbonate or the like. It is to be noted that copper sulphate and aluminum sulphate are considered to be chemical equivalents in this case as representing the "metal sulphates", and that where either is referred to in the claims it is to be understood that it is the intent not only to include the sulphate specifically mentioned, but also its equivalents. It is to be further noted that aluminum acetate and iron acetate are considered to be chemical equivalents in this case as representing the "metal acetates", and that where either is referred to in the claims it is to be understood that it is the intent to include the acetate specifically mentioned or its equivalents. It will also be noted that sodium chloride and sodium carbonate are considered to be chemical equivalents in this case as representing the "sodium salts", and that where either is referred to in the claims it is to be understood that it is the intent to include the sodium salt specifically mentioned in the claim or its equivalents. A mixture of copper sulphate, aluminum acetate and sodium chloride dissolved in a weak solution of an inorganic acid, such as sulphuric acid or nitric acid has given good results in the following approximate proportions:—

10% by weight of copper sulphate.
10% by weight of aluminum acetate.
80% by weight of sodium chloride.

The foregoing ingredients are preferably reduced to powdered form and intimately mixed in any desired manner. The dry mixture may be prepared and shipped to the trade in suitable packages, and need not be dissolved in the acid until a solution is required.

For removing scale from ordinary carbon steel, a solution of one pound of the powdered mixture of copper sulphate, aluminum acetate and sodium chloride in one pound of sulphuric acid and 98 pounds of water will be found to give good results. The powdered mixture is dissolved in the solution of water and sulphuric acid and the solution brought to a boil. The metal to be treated is immersed for a period of from 5 to 10 minutes, i. e., for a period long enough, as determined by observation to dissolve and remove the scale. At the end of the treatment, the metal is removed and washed in clear water.

For treating alloy steels the solution is preferably made up of 2 pounds of the powdered mixture of copper sulphate, aluminum acetate and sodium chloride, 2 pounds of nitric acid and 96 pounds of water. The treatment is the same as with the sulphuric acid solution. If desired, sulphuric acid may be used in lieu of the nitric acid as in treating carbon steel. It is to be noted that nitric acid and sulphuric acid are considered to be chemical equivalents in this case as representing the "inorganic acids" and that where either acid is referred to in the claims it is to be understood that it is the intent to include the acid specifically mentioned or its equivalents.

The foregoing proportions are given solely for illustrative purposes and without intent to limit the invention thereto, and it is therefore contemplated that said proportions may be varied to suit different conditions, without departing from the spirit of the invention.

It is not known at this time just precisely what reaction, physical or chemical, takes place during the treatment above described. It is believed, however, to be sufficient to state that the scale is apparently in some way dissolved and to a large extent disappears into the solution, and that the solution apparently does not attack the metal itself. In other words, the action of the solution appears to be in the nature of a direct attack upon the exposed surfaces of the scale and downwardly to the base metal, instead of from the base metal upwardly, as in the old processes. The treated metal will be found to be practically free of scale and in a condition capable of taking a high polish. This is particularly true with respect to alloys of chromium, nickel and steel, which cannot ordinarily be polished except by grinding with harsh abrasives. After treatment by the above process, the metal may be given a very high polish by simply buffing with standard type buffing devices. Observation and tests have shown that after treatment of the metal by the above process, the approximate loss in weight of the metal, due solely to the removal of the weight of the scale is a fraction of 1% as compared to a loss of from 1% to 20% under the old methods as now commercially practiced, due to dissipation of metal. It has also been demonstrated in practice that during the practice of this method it is not necessary to daily remove sludge accumulations in the tank, which is now a common experience with the old methods as now commercially practiced. Another important factor is that after the solution has become weakened by constant use, it may be quickly renewed by adding thereto the proper proportion of the metal sulphate, metal acetate and sodium chloride mixture and acid.

The advantages of the invention will be readily understood by those skilled in the art to which it belongs. It will be particularly observed that by means thereof a very rapid method of removing scale is provided, by means of which the scale is removed and dissipated without a deleterious attack upon the main body of the metal itself. A further and important advantage is that the solution apparently is neutral so far as the metal itself is concerned, and does not attack the metal after the scale has been removed, even though the metal may not be immediately removed from the solution. In view of this fact, the use of inhibitors is avoided, accumulations of sludge within the tank are prevented, and the life of the tank is indefinitely prolonged. Another advantage is that practically no fumes are generated in the vicinity of the tank. A very important advantage is that the scale is so completely removed by the treatment referred to, that sand blasting is rendered unnecessary and the surfaces may be highly polished by the simple method of buffing. Other most important advantages are that due to the weakness of the acid solutions employed, the materials may be handled with perfect safety by the workmen, and the destructive effect upon the vessels and apparatus required to handle it is practically negligible. In addition to this, it is not necessary to scrub the metal with concentrated acids, so that this element of danger to the workmen is entirely eliminated.

Having thus explained the nature of the invention and described an operative manner of constructing and using the same, although without attempting to set forth all of the forms in which it may be made, or all of the forms of its use, what is claimed is:—

1. A composition for use in pickling baths for ferrous metals comprising, a soluble mixture of copper sulphate, aluminum acetate, and sodium chloride, said mixture being soluble in weak sulphuric acid.

2. A composition for use in pickling baths for ferrous metals comprising, a mixture of powdered copper sulphate, aluminum acetate, and sodium chloride, said mixture being soluble in weak sulphuric acid.

3. A composition for removing scale from ferrous metals consisting of a mixture of copper sulphate, aluminum acetate, and sodium chloride in a sulphuric acid solution.

4. A composition for use in pickling baths for ferrous metals comprising, an intimate powdered mixture of 10% by weight of copper sulphate, 10% by weight of aluminum acetate, and 80% by weight of sodium chloride.

5. A composition for removing scale from ferrous metals comprising a weak solution of sulphuric acid containing a mixture of copper sulphate, aluminum acetate, and sodium chloride, in the proportion of 1 pound of said mixture, 1 pound of sulphuric acid and 98 pounds of water.

6. A composition for removing scale from ferrous metals comprising a mixture in the proportion of 10% by weight of copper sulphate, 10% by weight of aluminum acetate, 80% by weight of sodium chloride dissolved in a weak solution of sulphuric acid in the proportion of 1 pound of said mixture to 99 pounds of said weak sulphuric acid.

7. A composition for removing scale from ferrous metals consisting of a mixture of copper sulphate, aluminum acetate and sodium chloride dissolved in dilute nitric acid in the proportions of 2 pounds of the said mixture to 2 pounds of nitric acid and 96 pounds of water.

8. The process of removing surface scale from ferrous metals by penetrating the scale from the exposed surface thereof comprising applying to the metal to be treated a mixture of copper sulphate, aluminum acetate and sodium chloride in a sulphuric acid solution.

9. The process of removing surface scale from ferrous metals by penetrating the scale from the surface thereof comprising applying to the metal to be treated a weak solution of sulphuric acid containing a mixture of copper sulphate, aluminum acetate and sodium chloride in the approximate proportion of 1 pound of said mixture, 1 pound of sulphuric acid and 98 pounds of water.

OSCAR L. PETERSON.
HARRY L. PETERSON.
CLARENCE E. PETERSON.